United States Patent Office 2,755,792
Patented July 24, 1956

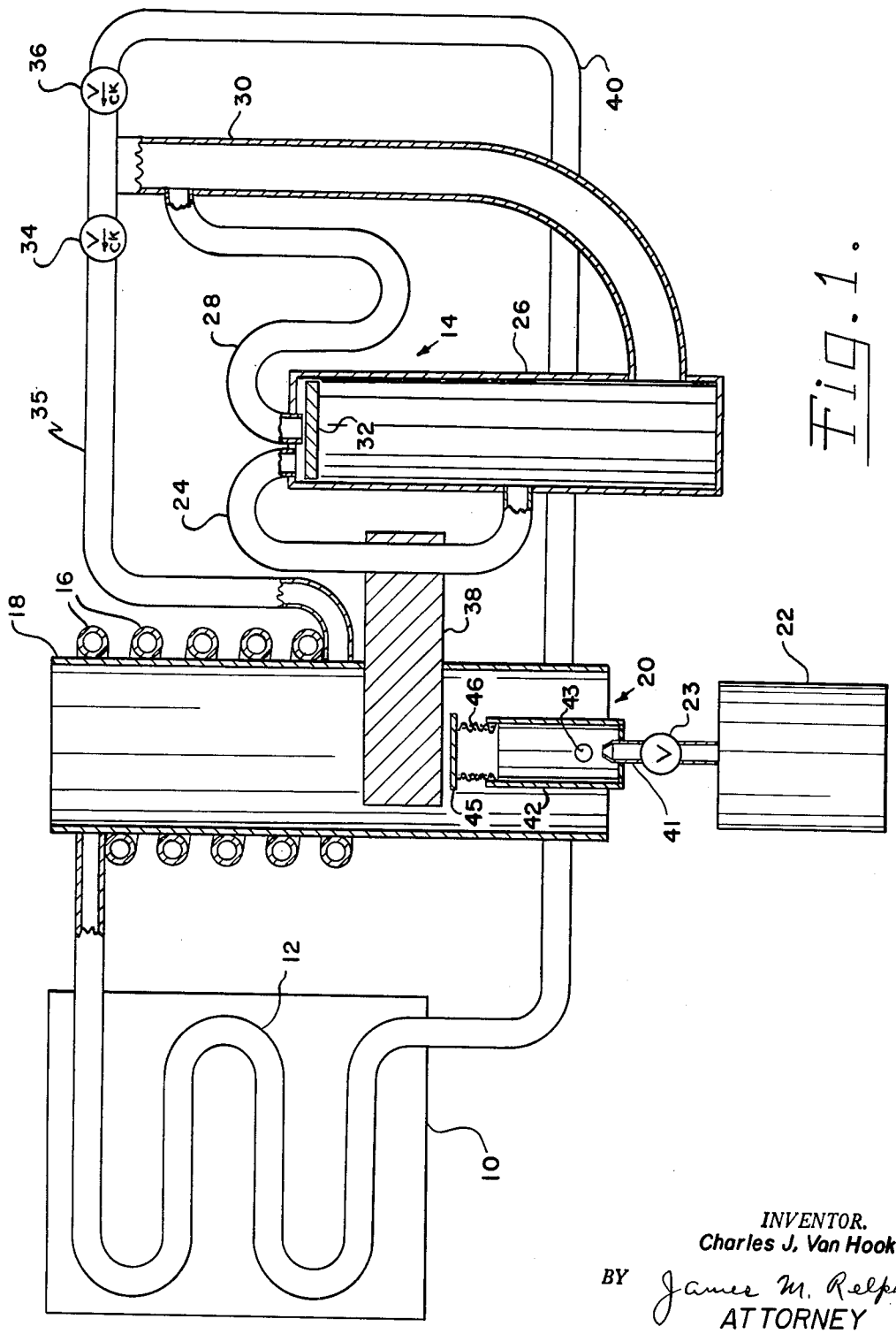

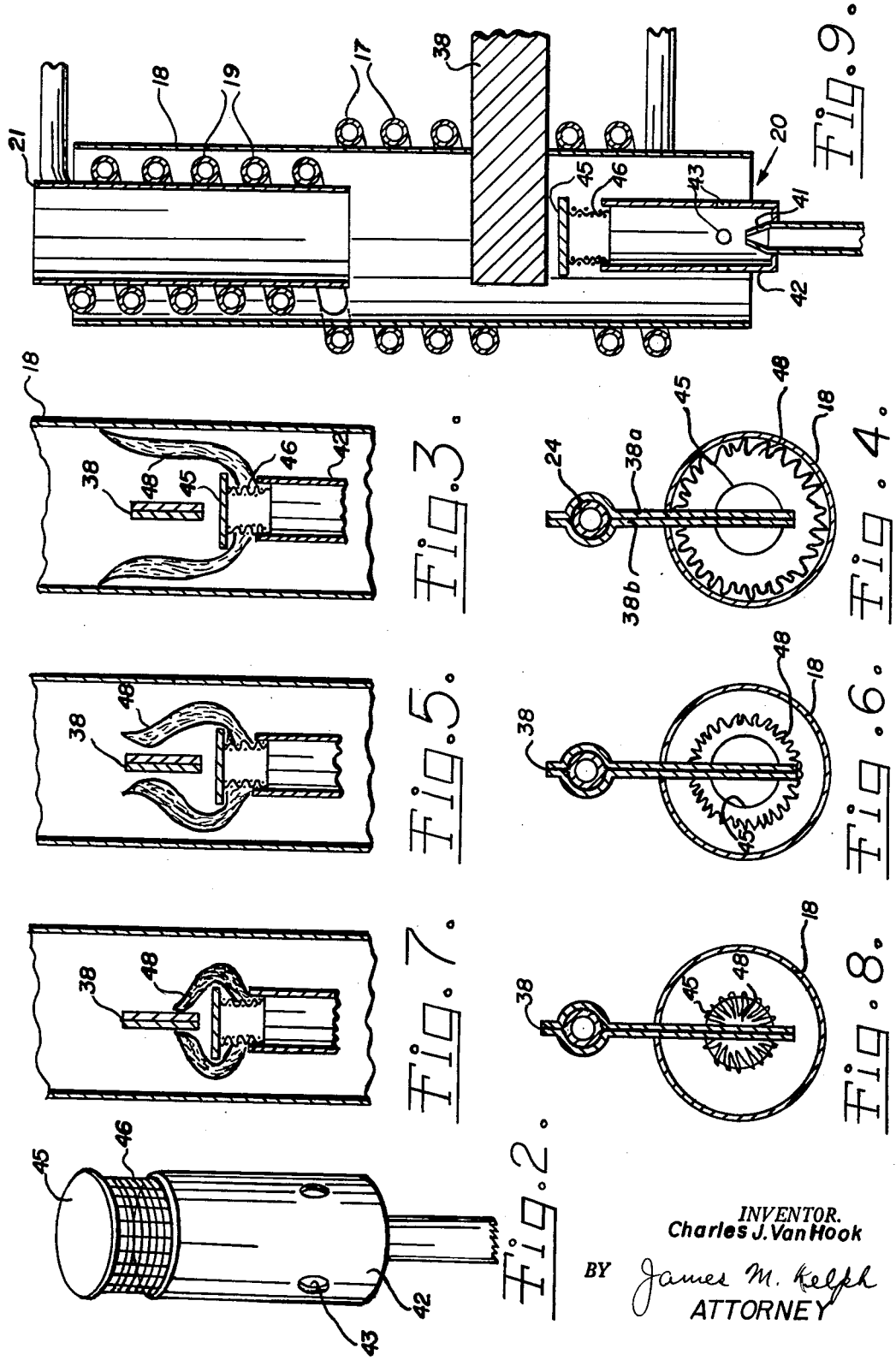

2,755,792

LIQUID HEATING AND CIRCULATING SYSTEMS

Charles J. Van Hook, Fair Lawn, N. J., assignor to Jet-Heet, Inc., Englewood, N. J., a corporation of New York Application July 3, 1953, Serial No. 365,953

7 Claims. (Cl. 126—210)

This invention relates to improvements in liquid heating and circulating systems, and particularly to an improved liquid heater and circulator wherein the circulator comprises a thermally actuated pump.

In a co-pending application of Robert E. Coleman et al., Serial No. 309,416, filed September 13, 1952, and assigned to the assignee of the present invention, there is described and claimed a personal heating system comprising a thermally actuated pump, or "thermopump," and a heat exchanger which cooperate to circulate heated liquid through a flexible liquid circuit in a blanket, a garment or the like for the purpose of supplying heat to an individual. In one embodiment, the pump and the heat exchanger receive heat from a burner supplied with fuel from a portable container, such as a bottle of liquefied gas. While not limited thereto, the present invention finds particular application in and will be described with special reference to a personal heating system of the foregoing type.

The terms "thermally actuated pump" and "thermopump" are used interchangeably herein to designate a liquid-filled unit within which liquid alternately is vaporized by heating and condensed by cooling. The expansion accompanying vaporization causes some of the liquid to be displaced from the pump, while the contraction accompanying condensation causes a fresh charge of liquid to be drawn back into the pump. When such a unit is suitably connected through check valves to a liquid circuit, the alternate discharge and intake of liquid will cause circulation through the circuit.

While the thermopump has a number of features and characteristics that made it particularly suitable for use in a self-contained, portable heating system as described above, one problem encountered in system design relates to modulation of the heat output.

Of the variety of ways in which the heat output can be regulated, the one deemed most economical of fuel consumption and best adapted to give uniform, reliable heating is to adjust the heat input as required to obtain the desired heat output under any given set of conditions. With a single burner supplying heat both to the pump and to the heat exchanger, it is to be expected that a variation in the burner ouput will simultaneously vary both the pump heat input and the input to the heat exchanger in proportionate amounts, thereby theoretically producing a corresponding variation in system output.

Unfortunately, however, there is a relatively narrow range of heat input values within which a thermopump will operate satisfactorily. At heat inputs below this range, the pump will not function at all due to insufficient heat. At inputs above this range, the pump liquid vaporizes more rapidly than it can be condensed, and a condition occurs in which the pump liquid boils continuously. This condition conveniently may be referred to as "lockout."

It has been found that the ratio of maximum to minimum heat input values within which a thermopump will operate satisfactorily is substantially less than the desirable ratio of maximum to minimum total heat input for a system of the type under consideration.

It is, accordingly, a general object of the present invention to provide an improved liquid heating and circulating system of the type wherein the circulator comprises a thermopump, and in which the heat input can be varied across a relatively wide range of values without failure of the pump unit.

In accordance with a preferred embodiment of the invention, the foregoing and other related objects and advantages are obtained in a liquid heating and circulating system which includes a burner arranged to supply a maximum percentage of its total output to the heat exchanger at high fuel input and a minimum percentage at low fuel input, while supplying a minimum percentage to the thermopump at high fuel input and maximum percentage at low fuel input. With such an arrangement, the variation in heat input to the thermopump is held to a minimum as system heat input is varied, thereby insuring that the widest possible variation of system heat input can be obtained without failure of the pump.

A more complete understanding of the invention can be had by reference to the following description of illustrative embodiments thereof, when considered in connection with the accompanying drawing, wherein Figure 1 is a diagrammatic view of a liquid heating and circulating apparatus embodying the invention, with some of the parts shown in section, Figure 2 is an enlarged perspective view of the burner in the apparatus of Figure 1, Figures 3, 5, and 7 are side views of the upper part of the burner in the system of Figure 1, showing the flame shape at different fuel inputs, Figures 4, 6, and 8 are top views corresponding to the side views shown in Figures 3, 5 and 7, respectively, and Figure 9 is a diagrammatic view of the heat exchanger in a modification of the apparatus shown in Figure 1.

Referring to Figure 1, there is shown an apparatus embodying the invention for supplying heated liquid to a heating unit 10 containing flexible tubing 12 through which the heated liquid is to be circulated. It will be understood that the heating unit 10 may comprise a blanket, a garment or any other heating element adapted to be heated by the circulation of hot liquid therethrough. The tubing 12 ordinarily will be of small diameter; much smaller than is indicated in the simplified representation of Figure 1.

The elements of the heating and circulating portion of the system, with which the present invention primarily is concerned, comprise a thermopump 14, a heat exchanger in the form of a coil of tubing 16 wound on a flue-defining stack 18, a burner 20 and a fuel supply container 22. Control of the flow of fuel from the container 22 to the burner 20 is by means of a valve 23 that may be arranged either for manual or for automatic adjustment. In the present instance, it is assumed that the container 22 is filled with liquefied gas, such as propane or the like, in which case the valve 23 normally will include regulating means to maintain a set fuel delivery rate for any given valve setting, regardless of changes in the fuel supply pressure, etc.

The thermopump 14 includes a heating tube 24 within which to vaporize liquid, a vapor collecting chamber 26 within which to collect vapor delivered from the heating tube 24, and a vapor tube 28 with which to conduct vapor from the collecting chamber 26 to a condenser tube 30. Inside the collecting chamber 26, there is preferably placed an insulating float element 32 for separating the liquid and vapor to prevent heat loss in the collecting chamber 26. Certain features of the pump 14 are described in greater detail and claimed in the co-pending application of Robert E. Coleman, filed July 5, 1952, Serial No. 297,371, and assigned to the assignee of the present application.

Assuming the pump 14 to be initially filled with liquid, the operation, in brief, is as follows:

When heat is applied to the tube 24, the liquid in the tube 24 will be vaporized and the vapor delivered to the top of the collecting chamber 26. Simultaneously, the formation of vapor will force liquid to flow out of the pump past an outlet check valve 34 connected to the condenser tube 30. When enough vapor has collected in the chamber 26 and the tube 28 to force the liquid level down to the lowermost point in the vapor tube 28, a hydrostatic unbalance will be created between the liquid columns in the collector 26 and the condenser 30. This will cause liquid to flow downwardly through the condenser tube 30 and upwardly in the collector 26, discharging vapor from the collector through the vapor tube 28 and into the condenser 30. As the vapor reaches the condenser 30, it will collapse, reducing the system pressure and causing fresh liquid to enter the pump through an inlet check valve 36. When the pump is completely refilled with liquid, the same cycle will repeat.

Upon leaving the pump, the liquid flowing past the check valve 34 will pass through a coupling tube 35 into the heat exchanger coils 16 to pick up additional heat, and as the pumping action continues this heated liquid eventually will flow into the load element tubing 12 where it will supply heat as desired. The cooled liquid coming back from the unit 10 will flow to the pump 14 through the inlet check valve 36 by way of a coupling tube 40.

Thus, it can be seen that the liquid in the system will be forced to circulate by the action of the pump 14, and will pick up heat both in the condenser 30 and in the heat exchange coils 16.

While it is possible to supply heat directly to the heating tube 24 by placing same in the stack 18 directly above the burner 20, it has been found more expedient to heat the tube 24 indirectly through a heat conducting fin 38, of metal or the like, extending into the stack 18 as shown. Not only does this produce more uniform heating of the tube 24, but also it facilitates assembly of the parts and makes for a more compact arrangement. As shown in Figure 4, for example, the fin 38 may comprise two identical strips 38a, 38b brazed together and shaped at one end to fit snugly around the heating tube 24.

In the system as thus far described, a burner flame that changes only in heat content with fuel supply variations has been found unsatisfactory for wide range variations of system heat input. As already stated, adjustment for proper operation at one end of the fuel input range is unsatisfactory for operation at the other end of the range.

In accordance with the present invention, this difficulty is overcome by arranging the burner to give a large percentage of its total heat to the heat exchanger 16 at high fuel rates, and to give a similarly large percentage of its total heat to the pump at the lower end of the fuel input range. In the specific embodiment of the invention presently being described, this is accomplished by having the burner flame shape change as the fuel input changes.

The burner 20 is constructed generally along the lines of the so-called Bunsen type burner, comprising a gas jet 41 opening into a mixing tube 42 which has air inlet openings 43 adjacent the jet 41 for admitting primary air to the mixing tube by aspirating action. At the upper end of the mixing tube 42 (see Figure 2), there is provided in accordance with the invention a "flame-spreader" cap 45 which diverts the flame at high fuel rates, as explained shortly, to obtain the desired relation between pump and heat exchanger heat input. In some instances, it is found helpful to fill the gap between the cap 45 and the end of the mixing tube with a cylinder of wire gauze material 46 to prevent flame "lift-off" at high fuel input rates, when the gas flow velocity otherwise might exceed the flame propagation rate and blow out the flame.

As is illustrated in Figures 3 and 4, the flame spreader cap 45 functions to divert the flame 48 away from the heating fin 38 and onto the stack wall at high fuel rate. Under these conditions, the fin 38 will not be contacted by the burner flame 48, and will receive from the flame relatively small amounts of heat, substantially entirely by radiation. The major portion of the flame heat will go into the heat exchanger through the stack wall.

As the fuel input rate is decreased, as illustrated in Figures 5 and 6, the flame 48 will begin to shrink inwardly, receding from the stack wall 18 and coming closer to the heating fin 38. This, obviously, will have the effect of decreasing the percentage of total heat going to the heat exchanger while increasing the percentage of total heat going to the heating fin 38. When the fuel rate is reduced to a minimum, as shown in Figures 7 and 8, the flame 48 will shrink inwardly still further and will play directly upon the heating fin 38, at the same time being completely out of contact with the stack wall. In this condition, the fin 38 will receive a maximum percentage of heat from the flame and the heat exchanger will receive a minimum percentage.

It should be noted that the change in the percentage of heat input to the heat exchanger is nearly as important as the change in percentage of heat input to the thermopump. This is due to the relationship between heat input, pump output and heat exchanger temperature rise.

In general, the temperature rise across the heat exchanger at any given time will be a function of the heat input to the heat exchanger and the volumetric flow rate through the heat exchanger. If the flow rate through the heat exchanger decreases without a corresponding decrease in heat exchanger input, then the temperature rise across the heat exchanger will increase. In the extreme case, when the flow rate through the heat exchanger becomes very low, the liquid in the heat exchanger may boil, causing excess pressure to develop in the system and other undesirable results.

Although the relationship between pump heat input and pump output is fairly linear at relatively high heat inputs, the output drops off more rapidly than the input as the input decreases. Accordingly, to prevent boiling in the heat exchanger, it is helpful not only to keep the pump heat input at the highest possible value, but also to decrease the input to the heat exchanger at a rate greater than the rate of decrease of system heat input.

In Figure 9, there is shown a modification of the apparatus of Figure 1, wherein the heat input to the heat exchanger can be controlled more effectively than with the heat exchanger arrangement shown in Figure 1. For simplicity, only the stack, heat exchanger and burner are shown in Figure 9, it being understood that the parts not shown correspond to the complete system of Figure 1.

In the Figure 9 system, the heat exchanger comprises two sets of coils 17, 19 connected in series. One set of coils, 17, is spread along the lower portion of the stack 18 in the vicinity of the pump fin 38, so that these coils 17 are closest to and most immediately affected by variations in the flame coming from the burner 20. The other set of coils 19 is wound on an inner sleeve 21 so that the coil assembly 19, 21 fits inside the stack 18 in the upper end thereof.

With this arrangement, as the flame is varied in the manner shown in Figures 3–8, the lower coil section 17 will receive a very high percentage of the total heat input at high fuel rates, with the upper section 19 receiving a much smaller percentage. As the fuel rate is decreased, ultimately reaching a minimum as in Figures 7 and 8, the coil 17 will receive less and less of the total heat input, until at the lowest flame rate the heat exchanger effectively will comprise only the coil section 19, which will receive about the same percentage of heat as it did at the high flame rate. This has been found to be the most suitable arrangement of the heat exchanger. It permits the use of a fairly large diameter stack 18 that gives ample combustion space in the vicinity of the burner tip, while placing a substantial section 17 of the heat exchanger close enough to the burner tip to pick up a high percentage of the total heat at high fuel rates, At lower rates, where the lower coil section 17 is ineffective, the upper section 19 takes over to provide an appropriately small heat exchange surface.

With a heat exchanger and burner as shown in Figure 9, for example, it has been found possible to vary the fuel rate in the ratio of 4 to 1 from maximum to minimum without objectionable temperature rise across the heat exchanger. Without the flame diverter cap 45, the best ratio obtainable was approximately 2.5 to 1.

I claim:

1. In a system for circulating heated liquid through tubing in a heating unit, in combination; a thermally actuated pump comprising a heating tube within which to vaporize liquid by heating, a second tube within which to condense vaporized liquid, and liquid and vapor communicating means coupling said tubes; a substantially vertically disposed flue-defining stack; a gaseous fuel burner within the bottom portion of said stack and comprising a mixing tube, means for introducing gaseous fuel and combustion-supporting air into one end of said mixing tube, and a cap extending across and spaced from the other end of said mixing tube; a first heat exchanger tubing coil wound around the outside of said stack in the vicinity of said burner; a second heat exchanger tubing coil wound inside said stack above said burner, a sleeve inside said second tubing coil; a liquid circuit connecting said coils in series; a pair of check valves connecting said pump to said circuit; a heat-conducting fin contacting said heating tube and extending into said stack above said burner cap; a gaseous fuel supply source coupled to said fuel introducing means, and means for varying the rate of supply of fuel from said source to said burner.

2. In a liquid heating and circulating system, in combination, a thermally actuated pump including a tube within which to vaporize liquid by heating, means defining a flue, said tube being located outside said flue a heat exchanger associated with said flue, a liquid circuit connecting said pump to circulate liquid through said heat exchanger, a burner in said flue, a fuel supply source for said burner, means to control the rate at which fuel is supplied from said source to said burner, conducting means extending into said flue above said burner for conducting heat from said burner to said tube, and a flame diverter positioned between said burner and said conducting means to divert flame away from said conducting means at high fuel rates and to permit the flame to contact said conducting means at low fuel rates.

3. In a system for circulating heated liquid through tubing in a heating unit, in combination, a thermally actuated pump including a heating tube within which to vaporize liquid by heating, means defining a flue, a fluid fuel burner in said flue, said burner comprising a mixing tube having an open end, a heat conductor extending from said heating tube to adjacent the open end of said mixing tube, a flame-spreader plate spaced slightly from and extending over said open mixing tube end between said mixing tube and said conductor, a source of fluid fuel for said burner, means to vary the rate of flow of fuel from said source to said burner, a sleeve inside said flue beyond said burner mixing tube open end, a heat exchanger comprising a first coil of tubing wound around said flue in the vicinity of said mixing tube open end and a second coil of tubing wound on said sleeve, and a circuit connecting said pump to circulate liquid through said heat exchanger.

4. In a system for circulating heated liquid through tubing in a heating unit, in combination; a thermally actuated pump comprising a heating tube within which to vaporize liquid by heating, a second tube within which to condense vaporized liquid, and liquid and vapor communicating means coupling said tubes; a substantially vertically disposed flue-defining stack; a gaseous fuel burner within the bottom portion of said stack and comprising a mixing tube, means for introducing variable amounts of gaseous fuel and combustion-supporting air into one end of said mixing tube, and a cap extending across and spaced from the other end of said mixing tube; a first heat exchanger tubing coil wound around the outside of said stack in the vicinity of said burner; a second heat exchanger tubing coil wound inside said stack above said burner, a sleeve inside said second tubing coil, a liquid circuit connecting said coils in series, means connecting said pump to circulate liquid through said coils, and a heat-conducting fin contacting said heating tube and extending into said stack above said burner cap.

5. In a system for circulating heated liquid through tubing in a heating unit, in combination; a thermally actuated pump comprising a heating tube within which to vaporize liquid by heating, a second tube within which to condense vaporized liquid, and liquid and vapor communicating means coupling said tubes; a substantially vertically disposed flue-defining stack; a gaseous fuel burner in said stack and comprising a mixing tube and means for introducing variable amounts of gaseous fuel and combustion-supporting air into one end of said mixing tube, and a cap extending across and spaced from the other end of said mixing tube; a heat exchanger tubing coil wound around said stack; a liquid circuit connecting said coil in series with said heating unit tubing, means connecting said pump to circulate liquid through said circuit, and a heat-conducting fin contacting said heating tube and extending into said stack above said burner cap.

6. In a system for circulating heated liquid through tubing in a heating unit, in combination; a thermally actuated pump comprising a heating tube within which to vaporize liquid by heating; a substantially vertically disposed flue-defining stack; a burner in said stack; a first heat exchanger tubing coil wound around the outside of said stack in the vicinity of said burner; a second heat exchanger tubing coil wound inside said stack above said burner; a sleeve inside said second tubing coil; a liquid circuit connecting said coils in series means connecting said pump to circulate liquid through said circuit; a heat-conducting fin contacting said heating tube and extending into said stack above said burner; and a flame diverter plate between said fin and said burner.

7. In a system for circulating heated liquid through tubing in a heating unit, in combination; a thermally actuated pump comprising a heating tube within which to vaporize liquid by heating, a second tube within which to condense vaporized liquid, and liquid and vapor communicating means coupling said tubes; a substantially vertically disposed flue-defining stack; a gaseous fuel burner within the bottom portion of said stack and comprising a mixing tube, and means for introducing gaseous fuel and combustion-supporting air into one end of said mixing tube; a first heat exchanger tubing coil wound around the outside of said stack in the vicinity of said burner; a second heat exchanger tubing coil wound inside said stack above said burner; a liquid circuit connecting said pump and said coils in series, a heat-conducting fin contacting said heating tube and extending into said stack above said burner; and means associated with said burner to direct to said fin an increasing proportion of the total heat supplied by said burner as said total supplied heat decreases.

References Cited in the file of this patent
UNITED STATES PATENTS

| | | |
|---|---|---|
| 245,416 | Turner | Aug. 9, 1891 |
| 700,535 | Monjo | May 20, 1902 |
| 809,164 | Beanes et al. | Jan. 2, 1906 |
| 873,182 | Springer et al. | Dec. 10, 1907 |
| 2,553,817 | Erland af Kleen | May 22, 1951 |
| 2,609,871 | Brumbaugh | Sept. 9, 1952 |

FOREIGN PATENTS

| | | |
|---|---|---|
| 32,586 | France | Nov. 29, 1926 |